United States Patent
Chandrasekaran et al.

(10) Patent No.: US 10,929,181 B1
(45) Date of Patent: Feb. 23, 2021

(54) DEVELOPER INDEPENDENT RESOURCE BASED MULTITHREADING MODULE

(71) Applicant: ITERATE STUDIO, INC., Denver, CO (US)

(72) Inventors: Arulkumaran Chandrasekaran, Tamilnadu (IN); Chatura Samarasinghe, San Jose, CA (US); Brainerd Sathianathan, Morgan Hill, CA (US)

(73) Assignee: ITERATE STUDIO, INC., Denver, CO (US)

( * ) Notice: Subject to any disclaimer, the term of this patent is extended or adjusted under 35 U.S.C. 154(b) by 0 days.

(21) Appl. No.: 16/692,941

(22) Filed: Nov. 22, 2019

(51) Int. Cl.
*G06F 9/48* (2006.01)
*G06F 9/50* (2006.01)

(52) U.S. Cl.
CPC .......... *G06F 9/4881* (2013.01); *G06F 9/5044* (2013.01)

(58) Field of Classification Search
CPC .............................. G06F 9/4881; G06F 9/5044
See application file for complete search history.

(56) References Cited

U.S. PATENT DOCUMENTS

| | | | |
|---|---|---|---|
| 2017/0230479 A1* | 8/2017 | Tolman | H04L 67/06 |
| 2017/0277521 A1* | 9/2017 | Sharma | G06F 8/34 |
| 2019/0138920 A1* | 5/2019 | Lin | G06N 5/045 |
| 2019/0286478 A1* | 9/2019 | Sengupta | G06F 9/4881 |
| 2019/0324783 A1* | 10/2019 | Kazak | G06F 9/542 |

OTHER PUBLICATIONS

Youtube, "What the heck is the event loop anyway?", Uploaded on Oct. 9, 2014 by user "JSConf"; https://www.youtube.com/watch?v=8aGhZQkoFbQ>, (Accessed Feb. 24, 2020).

* cited by examiner

*Primary Examiner* — Sisley N Kim
(74) *Attorney, Agent, or Firm* — Dorsey & Whitney LLP

(57) ABSTRACT

The present disclosure relates generally to a method of executing application code developed using a simplified programming interface. I/O tasks and processing intensive tasks are designated as event callbacks in a single event loop runtime environment. The I/O tasks and processing intensive tasks are generated in association with a user request. Tasks associated with event callbacks are offloaded for execution using a resource based multithreading module to allocate the tasks between a plurality of processors based on the current utilization of each of the plurality of processors and an estimation of computing resources for execution of the tasks. The tasks are executed at the allocated processors of the plurality of processors and the user request is fulfilled using results of the executed tasks.

20 Claims, 8 Drawing Sheets

DEVELOPER INDEPENDENT RESOURCE BASED MULTITHREADING MODULE

TECHNICAL FIELD

The technology described herein generally relates to use of a resource based multithreading module in conjunction with a single event loop runtime environment to fulfill user requests.

BACKGROUND

Many interfaces, such as websites and mobile applications, are developed for execution in a single event loop runtime environment, in which one request is executed at a time. For example, a website developed for execution in a single event loop runtime environment may include a currency conversion calculator. A user can enter numbers into the calculator and press an "=" button to receive a result. When the user presses the "=" button, a request is executed in the single event loop runtime environment to perform the currency conversion the user previously entered into the calculator. Performing the currency conversion will likely include an operation to access a source (such as an official database) of information on current exchange rates. While the request is executed (i.e., the network accesses the current exchange rates), no other requests can be executed because of the single event loop. This means that while a user may attempt to scroll, click other links, or enter text, the website remains "frozen" until the network accesses the exchange rates and the calculation is completed. Once the calculation is completed, other requests that the user makes of the website are executed.

The phenomenon of one task appearing to freeze or render a website or application unresponsive is called blocking. To handle the problem of blocking, many single event loop runtime environments use asynchronous callbacks. In runtime environments with asynchronous callbacks, operations and requests are labeled either for immediate execution or as an event callback. The runtime environment generally labels operations as event callbacks without additional input or structuring from the programmer. When an operation labeled as an event callback reaches the point of execution, it is allocated to another location to process. While the callback is processing, other immediate execution operations can be executed and other callbacks can be allocated for processing. When a callback is processed, it is returned to the event loop for execution. This structure means that more than one request can be handled by a single event loop.

In the example of the currency calculator website, the operation to access current exchange rates can be handled as a callback so that while the network is accessing exchange rates, the user can continue to use other features on the website. Perhaps more importantly, other users using the same website can use all features of the website without waiting for the first user's request to complete. The asynchronous callback structure means that applications and websites are easy to scale vertically (to handle requests from more users) using single event loop runtime environments. Without asynchronous callbacks, a programmer or developer generally uses additional data structures to handle requests from multiple users, which can become cumbersome as requests are received from more users.

Currently, asynchronous callbacks are available for tasks which are I/O intensive, such as making requests over a network. Tasks that may use a large amount of computing resources, such as large or complex calculations, are labeled as immediate execution and may still cause blocking, making websites and applications appear unresponsive. Accordingly, developers use technical knowledge to structure code to avoid blocking and single event loop runtime environments, which provide simple vertical scaling, are difficult to employ with simplified programming interfaces intended for novice developers, such as graphical programming interfaces.

SUMMARY

A method for execution of application code developed using a simplified programming interface is provided. I/O tasks and processing intensive tasks are designated as event callbacks in a single event loop runtime environment. The I/O tasks and processing intensive tasks are generated in association with a user request. Tasks associated with event callbacks are offloaded for execution using a resource based multithreading module to allocate the tasks between a plurality of processors based on the current utilization of each of the plurality of processors and an estimation of computing resources for execution of the tasks. The tasks are executed at the allocated processors of the plurality of processors and the user request is fulfilled using results of the executed tasks.

A computing system for executing a task allocation agnostic application codes includes a plurality of processors and an application engine executing on the plurality of processors. The application engine includes an interpreter configured to identify an intensive task from a plurality of tasks in a received request from a user. The identification is based on a estimation of computing resources for execution of the intensive task. The computing system also includes a runtime environment including a call stack configured to execute the tasks of the application code. The call stack executes a task as a task reaches an execution position within the call stack. A resource based multithreading module also executes on the processors of the computing system and includes a task queue, a scheduler, and an interface. The task queue is configured to remove the intensive task from the call stack as the intensive task reaches the execution position. The scheduler is configured to allocate the intensive task to a processor of the plurality of processors based on the estimation of computing resources for execution of the intensive task and a current utilization of each of the plurality of processors. The processor executes the allocated intensive task to obtain a result of the intensive task. The interface is configured to return the result of the intensive task to the runtime environment. The runtime environment is configured to use the result of the intensive task in completing the request of the user.

A method for allocating an intensive task in an application code developed using a programming interface to a processor for execution is provided. The method is obscured from the programming interface and includes determining an estimation of computing resources for execution of an intensive task received from a JavaScript runtime environment as a result of a received user request. The intensive task is then allocated to one of a plurality of processors based on a current utilization of each of the plurality of processors and the determined estimation of computing resources for execution of the intensive task. The task is processed at the allocated processor and the processed task is returned to the JavaScript runtime environment as a callback. The JavaScript runtime environment uses the processed task in completing the user request.

In addition to the exemplary aspects and embodiments described above, further aspects and embodiments will become apparent by reference to the drawings and by study of the following description.

DETAILED DESCRIPTION

Figure 1:
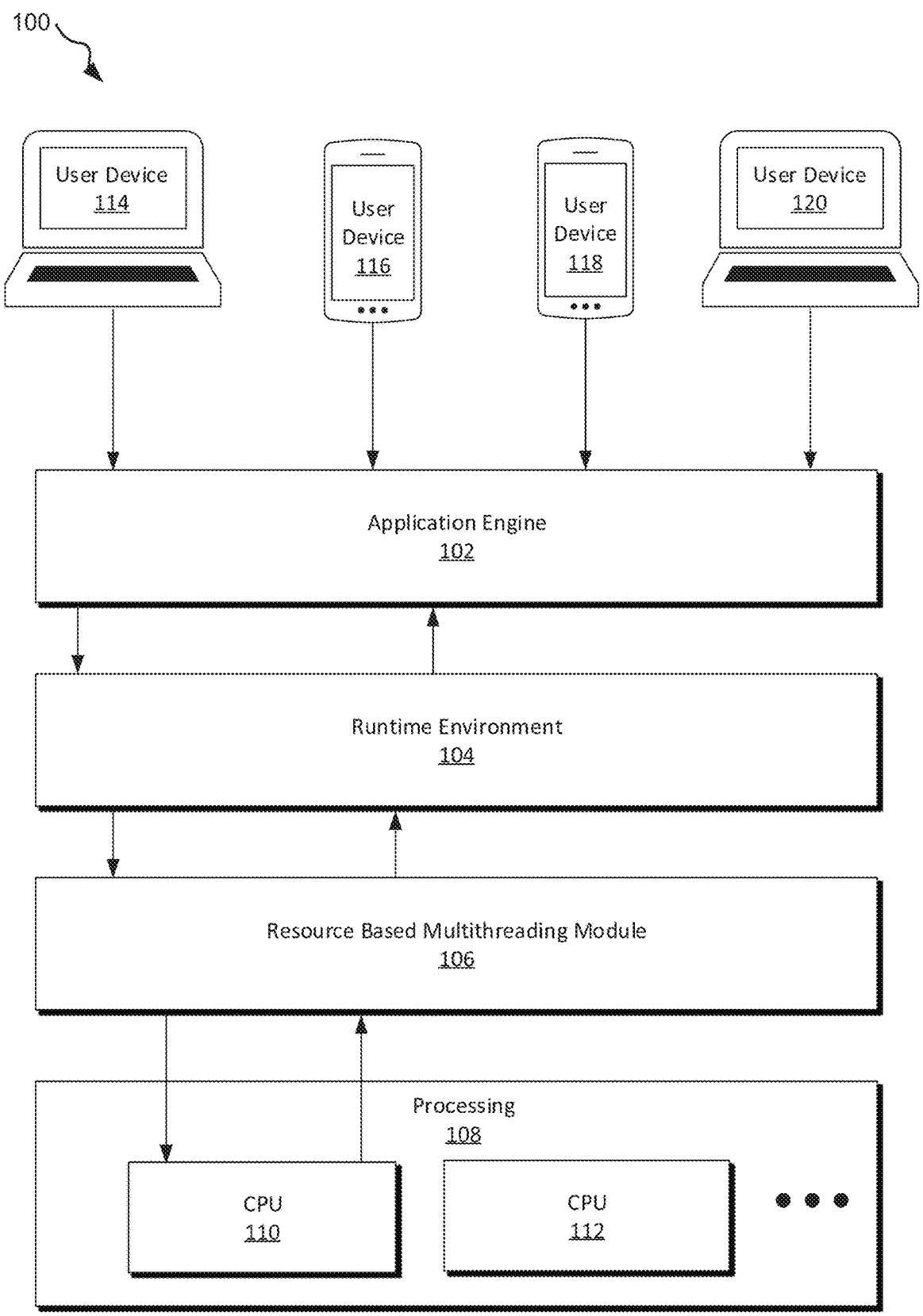
FIG. 1 illustrates a diagram of a computing system including a resource based multithreading module to allocate tasks received by an application engine and executed in a runtime environment.

Generally, in event driven environments, such as JavaScript, source code is compiled and as the code is executed operations are added to a call stack. The top operation on the call stack is executed, then the next operation on the call stack is executed, and so on, until all operations are executed. However, some operations may take longer to execute, preventing other operations from executing even when processing resources are available, this is known as blocking.

Asynchronous callbacks can be used to address blocking, with such callbacks, operations are designated as immediately executable or as an event callback. Event callbacks are generally more complex operations that take longer to execute, such as a request from a network, i.e., those that are not immediately executable. During execution, when an event callback reaches the top of the call stack, the event callback is removed from the call stack and submitted to a worker pool. While in the worker pool, the event callback is executed. For example, in the case of a network request, the event callback remains in the worker pool until a response to the request is received from the network. When the response is received from the network, the callback is returned to a callback queue. The event loop returns callbacks in the callback queue to the call stack for processing. Continuing with the network request example, when the event loop returns the callback to the call stack, the result of the network request may be displayed to the user when the callback is returned to the call stack and is processed.

Advantageously, while the event callback is in the worker pool, the call stack continues to execute other operations in the call stack. This is especially helpful when applications or websites handle requests from multiple users because subsequent users will be able to have requests executed by the call stack while the first user's request is executed in the worker pool. Subsequent requests may also be assigned to the worker pool and their processing is controlled by the event loop, meaning that the application or website is more likely to handle requests "fairly" between users, rather than waiting for the first user's tasks to complete. Event loop structure is typically inherent in the single event loop runtime environment, so developers do not have to use advanced programming techniques to ensure fair request balancing among multiple users, allowing applications and websites to be scaled vertically in a relatively simple manner.

Current asynchronous callbacks utilized in single event loop runtime environments are structured to handle I/O tasks, but are not structured to handle CPU intensive tasks, such as calculations that use a large amount of computing resources and may take longer to execute. So, although I/O operations can execute in the background, CPU intensive tasks are executed as part of the execution stack and an entire application may be blocked until the CPU intensive task is complete. In systems with multiple processors, several processors may sit idle while one processor works intensely on a CPU intensive task and many other tasks are waiting in a queue to be handled (although resources are available). Further, requests from other clients cannot be executed until the task completes. For applications that handle multiple client requests, such as websites, this blocking is detrimental, slows response time, and may discourage visitors and users as the website will seem slow and unresponsive at times.

Further, while current single event loop runtime environments may include commands and structures to move CPU intensive tasks off of the call stack, these commands or structures may be difficult to implement and do not include intelligent allocation of CPU intensive tasks between multiple available processors. For example, a command may create child threads to execute CPU intensive tasks. As CPU intensive tasks reach the top of the call stack, the tasks are assigned to child threads in a round-robin manner. As such, there is no intelligent allocation of tasks based on the complexity of the task or computing resources used by the task. This round-robin allocation can result in overloading of one processor and underutilization of other processors, i.e., the entire computation is delayed even though resources are available. In these instances, certain applications, such as websites, may appear unresponsive or the like to a user, even though there is available compute capacity.

Available commands and structures often require knowledge about the structure of the single event loop runtime environment to implement the commands or structures to prevent blocking and allocate tasks in an efficient manner. Because of the knowledge required, these methods may be incompatible with simplified programming interfaces that aim to allow novice programmers with limited knowledge to generate functional code. These methods may also be difficult for programmers using traditional programming interfaces where it is more efficient and simple to create code without considering task allocation.

In the present disclosure, a developer independent resource based multithreading module is used in a single event loop runtime environment having an asynchronous callback structure, allowing capitalization on the scalability of the single event loop runtime environment while intelligently allocating CPU intensive tasks to take advantage of multiprocessing. Further, applications including CPU intensive tasks, such as machine learning in single event loop runtime environments, can be implemented in the present architecture without requiring sophisticated programming knowledge because the resource based multithreading module works with the runtime environment to allocate tasks without additional input from the developer. The resource based multithreading module and single event loop runtime environment may be obscured from the developer in a simplified or traditional programming interface so that the developer can program without considering task allocation.

The ability to use the resource based multithreading module for task allocation allows more developers to utilize artificial intelligence successfully in large scale applications because less computing and programming knowledge is required to implement machine learning without overburdening computing resources. Because less specialized skill is needed to implement these applications, entities can more readily implement functionality into their websites and other applications, without requiring large time and monetary investment of programmers and developers.

The resource based multithreading module operates in conjunction with the single event loop runtime environment with asynchronous callbacks. Instead of pulling only I/O operations from the call stack, as conventional application programming interfaces, the resource based multithreading module pulls both I/O operations and CPU intensive operations from the call stack, so that both I/O tasks and CPU intensive tasks can execute while other operations are executed on the call stack. The resource based multithreading module places tasks pulled off of the execution stack into a task queue to be passed to a scheduler in a first in, first out pattern. The scheduler allocates a task to a thread within the multithreader execution pool. The threads within the execution pool are associated with one of a plurality of processors. The scheduler allocates tasks to a thread based on the current utilization of the processors in the plurality of processors with free threads and the computational intensity of the task.

Once a task is executed by a processor, the resource based multithreading module returns the result to a callback queue of the runtime environment as a callback and the thread used to execute the task is free for tasks remaining in the task queue. When the result of the task is returned to the callback queue, the event loop controls when the callback is returned to the execution stack for execution. In this manner, the resource based multithreading module acts to both horizontally and vertically scale applications, helping to maximize utilization of compute resources and schedule tasks, allowing commands to be executed faster on fewer resources and/or improve responsiveness for commands with the same resources as compared to conventional thread approaches.

As one example, the multithreading module acts as thread pool to handle the execution of tasks in Node.js. In this example, the main thread function calls tasks to the shared task queue, which threads in the thread pool pull and execute. In operation the module acts to not block system functions, such as networking translate to kernel-side non-blocking sockets, while blocking system functions such as file I/O run in a blocking way on their own threads. When a thread in the pool completes a task, it informs the main thread of completion, which in turns, wakes up and executes the registered callback. In this manner, the thread pool can automatically cater to further requests without blocking new similar requests coming in, until a threshold of CPU or I/O resource availability has been reached In certain instances, the multithreading module may enhance performance by 2 to 3 times as compared to conventional architectures, while also omitting the need for the developer to understand code performance (e.g., which requests might block others), allowing less skilled developers to contribute code for the application.

FIG. 1 illustrates a diagram of a computing system 100 including a resource based multithreading module 106 to allocate tasks received by an application engine 102 and execute in a runtime environment 104. Generally, an application engine 102 receives user requests from user devices (i.e., user devices 114, 116, 118, and 120), which may be computers, smart phones, etc. User requests may include requests to access resources on a website or application, requests to interact with a website or application, and/or requests to submit information to a website or application. A single user request may invoke a cascade of programming operations of the website or application, e.g., a request to access resources on a website may include operations for updating the user interface of the website to indicate the request is being processed, retrieving the resources, and displaying the resource to the user when it is retrieved, among other operations.

User requests may be sent from a user device to the application engine 102 as a hypertext transfer protocol (HTTP) request transmitted to the application engine 102 using transmission control protocol (TCP) and then may be transmitted over a network to the application engine 102. The application engine 102 may be located, for example, on a server allocated to the website or application associated with the application engine 102. The application engine 102 generally receives the incoming user request, compiles the machine readable code to execute the user request, and routes the machine readable code to the runtime environment 104.

In system 100, the multithreading module 106 allocates tasks associated with the user request and the application engine 102 may include a compiler that categorizes tasks as intensive tasks or immediately executable tasks before passing the machine readable code to the runtime environment 104. An intensive task may be, for example, an I/O intensive task, a processor intensive task, or any other task that may not execute quickly or easily and may block other user requests, causing the application or website to appear unresponsive or slow. The categorization of intensive tasks by the application engine 102 provides the runtime environment 104 with information about tasks to execute as call backs. Advantageously, when tasks are categorized as intensive tasks before machine readable code is passed to the runtime environment 104, the runtime environment 104 may be used without modification.

In some implementations, the application engine 102 may also provide an estimation of computing resources for execution of the intensive tasks. This estimation may be used by the resource based multithreading module 106 to efficiently allocate the intensive tasks among processors (e.g., CPUs 110 and 112). The estimation may be based on resources used for the task (e.g., whether a task uses processing power or I/O), historical use of resources for execution of similar tasks, characteristics of the task itself, and/or other parameters. In some implementations, the application engine 102 may continually update historical data after intensive tasks are executed to generate more accurate estimates for the computing system over time, but in other implementations, the application engine 102 may update historical data at set intervals (e.g., every other day, twice a week, or the like), or may be structured to update when directed.

As the machine readable code is passed to the runtime environment 104, the code is executed like other code in the runtime environment 104. Broadly, tasks categorized as immediately executable are executed as they reach the top of a call stack and tasks categorized as intensive tasks are offloaded to the resource based multithreading module 106 for execution. The intensive tasks are then returned to the runtime environment 104 to be executed as callbacks, even though the runtime environment 104 may not be modified to handle intensive tasks as callbacks. For example, the runtime environment 104 may be any runtime environment using a single event loop and asynchronous callbacks, such as JavaScript or node.js, where these environments are not modified to handle the intensive tasks as callbacks, but given that these runtime environments are generally simpler to use as compared to other non-single loop environments, and can handle requests from multiple users without additional input from the programmer.

The resource based multithreading module 106 allocates tasks categorized as intensive tasks amongst processors. For example, in FIG. 1, the resource based multithreading module 106 allocates intensive tasks to at least CPU 110 and CPU 112. The resource based multithreading module 106 may allocate tasks based on utilization or capacity. For example, the resource based multithreading module 106 may use an estimation of computing resources required for execution of the intensive tasks when allocating resources, helping to more evenly distribute compute capacity across resources. In some implementations, the estimation is generated by the application engine 102 and received along with the intensive tasks, e.g., as tagged data, or the like, in other implementations, the estimation is generated by the resource based multithreading module 106, or otherwise determined.

Intensive tasks are queued when they reach the resource based multithreading module 106 and when an intensive task reaches the front or top of the queue, the resource based multithreading module 106 evaluates the estimated computing resources required for the task, along with the current utilization of processors available for processing the task. The resource based multithreading module 106 then assigns the intensive task to a processor that is both free (or at least more capacity than other resources) to execute a new task and computing resources available to execute the particular intensive task. Where two or more processors meet the above criteria, the resource based multithreading module 106 may assign the task to the processor with the most availability.

By allocating tasks based on availability and estimated time, the system 100 can better utilize the capabilities and capacities of multiple processor hardware structures. As an example, a thread pool including six threads where three threads are associated with the CPU 110 and three threads are associated with the CPU 112, in conventional round-robin task allocation, tasks are assigned to the next available thread as tasks reach the front of a task assignment queue Accordingly, all of the threads associated with, for example CPU 112 may be busy with I/O tasks using a relatively small amount of resources, leaving CPU 112 with excess capacity. In contrast, two threads associated with CPU 110 may be busy with processor intensive tasks, utilizing the full capacity of the CPU 110. Meanwhile, CPU 112 is underutilized from a processing perspective.

On the contrary, with the same six threads, using the resource based multithreading module 106, a scheduler considers the capacity and current utilization of both CPU 110 and CPU 112 when allocating tasks. In an example, CPU 112 has one free thread and two threads occupied with I/O intensive tasks while CPU 110 has two free threads and one thread occupied with a processing intensive task. In the round-robin allocation described above, the processing intensive task may be assigned to the CPU 110 because the CPU 110 is next in line to handle a new task, resulting in the underutilization. Here, the scheduler assigns the processor intensive task to the CPU 112, taking advantage of the processing capability of the CPU 112. The CPU 110 still has free threads for other I/O intensive and processing intensive tasks, such that websites and applications can more effectively horizontally scale by adding additional processors, even when executing a runtime environment with a single event loop for simple vertical scaling. Resource based allocation also helps to fully utilize existing processing resources, such that additional processing resources do not need to be added to a system to still experience an increased performance, e.g., increased responsiveness, for a given application or website including the multithreading module 106.

After task execution by the CPU 110 or the CPU 112, the result of the task is returned to the resource based multithreading module 106, which returns the result to a callback queue in the runtime environment 104. The event loop of the runtime environment 104 may operate conventionally to move the callbacks to the stack to execute in the runtime environment 104. Once all tasks associated with a user request are executed within the runtime environment 104, the runtime environment 104 returns an output for the request to the application 102, returning the output to the user device where the request originated. When the runtime environment 104 receives the result of a task to execute as a callback, the runtime environment 104 treats the callback like any other callback executed within the runtime environment 104, i.e., does not have visibility to the allocation threading implemented by the module 106.

Figure 2:
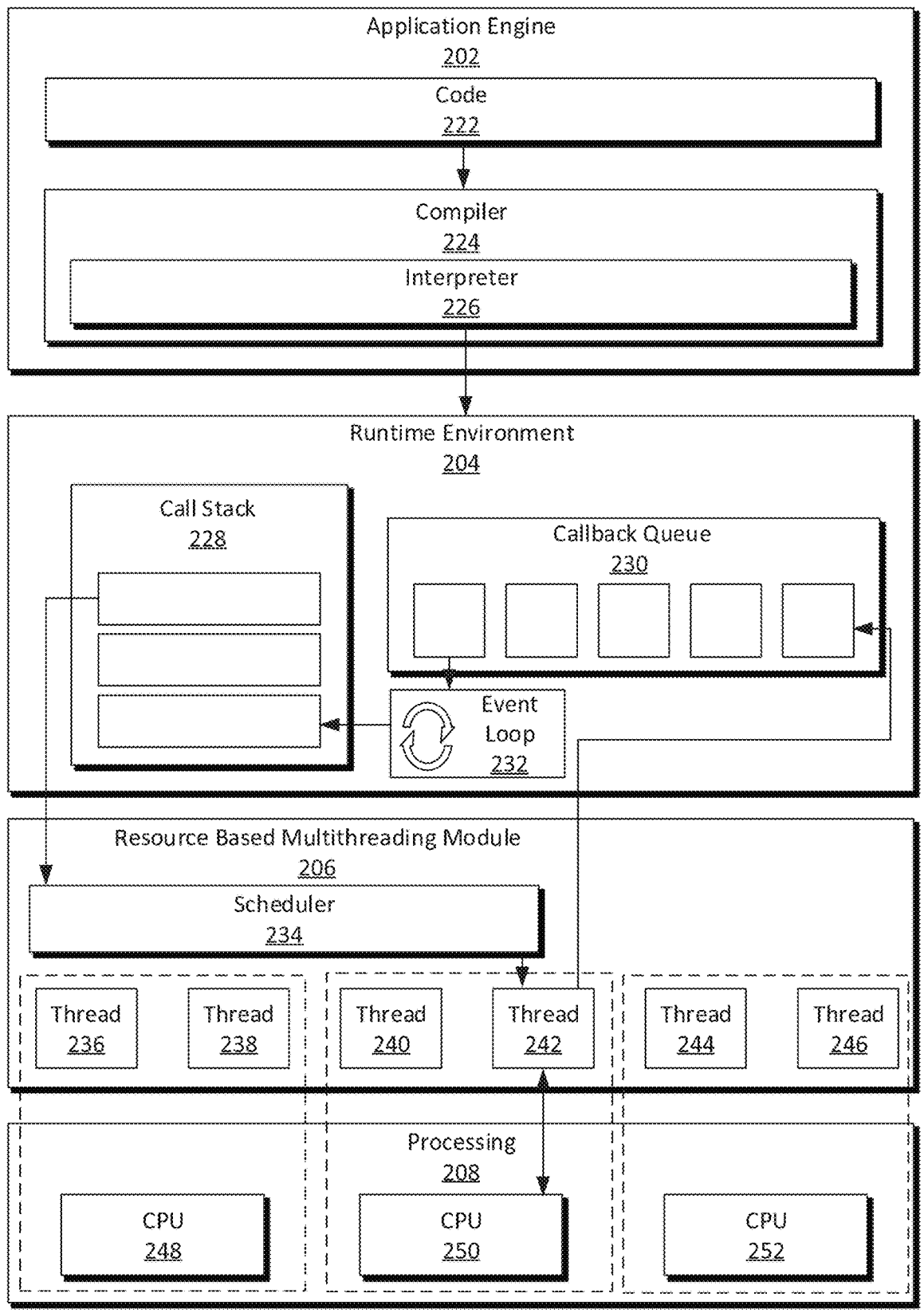
FIG. 2 is a detailed block diagram of a system including a resource based multithreading module to allocate tasks received by an application engine and executed in a runtime environment to one of several processors.

FIG. 2 is a detailed block diagram of a system including a resource based multithreading module 206 to allocate tasks received by an application engine 202 and executed in a runtime environment 204 to one of several processors. The application engine 202 receives a request from a user and recalls code 222 associated with the received request, as some examples, the code 222 may be JavaScript source code, graphical code with associated source code, or the like. The code 222 is relayed to a compiler 224 in the application engine 202 for execution. In the system shown in FIG. 2, the compiler 224 includes an interpreter 226 that identifies tasks within the code 222 and categorizes the tasks into immediately executable tasks (e.g., simple, quick tasks) and intensive tasks (e.g., demanding, long, complicated tasks). Intensive tasks are executed as callbacks and are usually I/O intensive and/or processor intensive tasks. During compilation of the code 222, the compiler indicates tasks to execute as callbacks in a conventional method for the runtime environment 204.

The interpreter 226 may also estimate computing resources or compute time for executing intensive tasks. For example, the interpreter 226 may use data indicating computing resources used in executing the same functions in the past. This data may be continually updated as the computing system processes user requests, leading to more accurate estimations of computing resources over time. Additionally or alternatively, the interpreter 226 may use interpolation or other estimation methods to estimate based on inputs and parameters of the function in the code 222. This estimation may then be associated with an operation when the operation is passed to the runtime environment 204. Generally, the estimation will not affect how the runtime environment 204 executes a task, but rather the estimation remains with the task and is used by the resource based multithreading module 206 to allocate the task to a processor.

When a request is passed to the runtime environment 204, tasks associated with the request are added to a call stack 228 of the runtime environment. Immediately executable tasks are executed by the runtime environment when the task reaches the top of the call stack 228. When an intensive task reaches the top of the call stack 228, the intensive task is removed from the call stack 228 and passed to the resource based multithreading module 206 for allocation to a processor for execution. The runtime environment 204 maybe configured to handle immediately executable tasks and callbacks in this manner such that the runtime environment 204 does not need to be modified to process intensive tasks in conjunction with the resource based multithreading module 206.

A scheduler 234 allocates tasks to processors in a processing pool 208. The scheduler 234 may be configured to access the estimation of computing resources for executing the task generated by the interpreter 226. In other implementations, the estimation of computing resources for executing the task may be generated by the scheduler 234.

The scheduler 234 monitors a thread pool including threads associated with processors in the processor pool 208. For example, as shown in FIG. 2, a CPU 248 is associated with threads 236 and 238, a CPU 250 is associated with threads 240 and 242, and a CPU 252 is associated with threads 244 and 246. In other implementations, the processor pool 208 may include fewer or more processors. Further, the processors in the processor pool may be associated with fewer or more threads, depending on how the processor is configured to handle tasks in parallel. By monitoring the thread pool, the scheduler 234 tracks which threads are available to execute tasks and which threads are busy.

The scheduler 234 also monitors or receives input regarding the utilization of CPUs 248, 250 from a resource perspective. When a new intensive task is received by the scheduler 234, the scheduler 234 uses one or more of the following parameters: the estimation of processing resources required for execution, status of threads in the thread pool, and current utilization of the CPUs 248, 250, and 252 to allocate the task to a CPU with a free thread, and/or resources to complete the intensive task. In some implementations, the scheduler 234 may use different logic in allocating I/O intensive tasks and processor intensive tasks. For example, a processor intensive task may be allocated to a CPU with a free thread and a low processor utilization relative to other CPUs in the processing pool 208. An I/O intensive task, in contrast, may be allocated to a CPU with a free thread and a high processor utilization relative to other CPUs in the processing pool. This logic allows CPUs engaged in processor intensive tasks to take on additional I/O tasks, which require fewer processing resources, as those CPUs have capacity to do so. This leaves threads associated with CPUs having more capacity to handle processor intensive tasks that may be queued for processing, such that each CPU is as fully utilized as possible. With this structure, the scheduler 234 is unlikely to have to wait for a free thread associated with a CPU with available capacity as processor intensive tasks come up in a queue for allocation.

In the example shown in FIG. 2, the scheduler 234 has allocated a task to the thread 242 associated with the CPU 250. The CPU 250 executes the task and the thread 242 returns the result to the runtime environment 204. The thread 242 is then returned to the resource based multithreading module as a thread available for execution of another intensive task. The thread 242 returns the result of the task to the runtime environment 204 as an event callback. The event callback is placed in a callback queue 230 within the runtime environment 204. The event loop 232 controls when event callbacks in the callback queue are returned to the call stack 228 for execution, where the event loop 232 is generally configured to handle callbacks in the this manner.

Once the event loop 232 moves an event callback to the call stack 228, the event callback is executed. In many instances, the execution of the event callback means that other functions or operations use the result of the event callback to return a result of the user's request to the user. In some instances, the execution of the event callback returns the result directly to the user.

Figure 3:
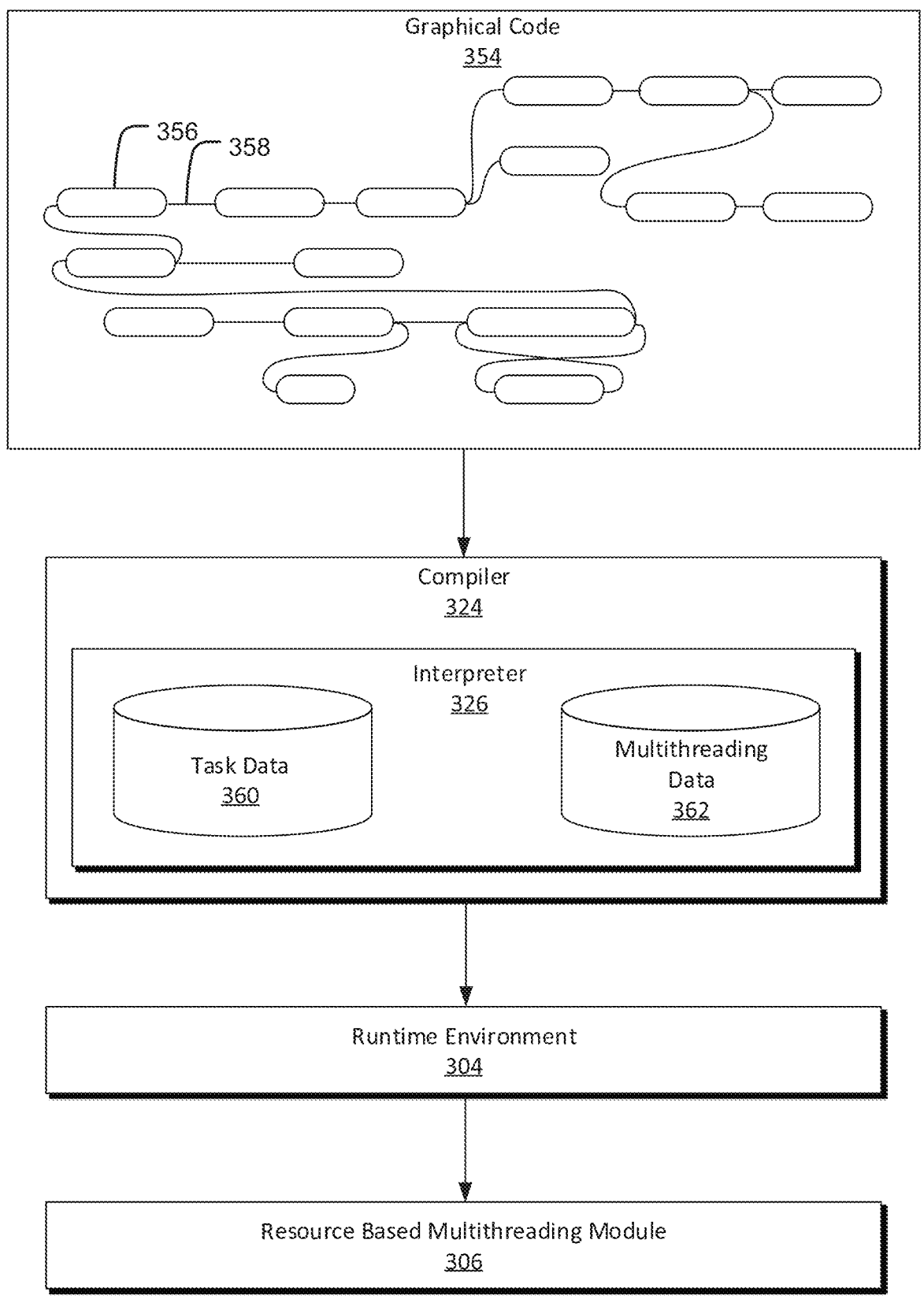
FIG. 3 is a diagram of a compiler, including an interpreter, compiling graphical code for execution in a runtime environment.

FIG. 3 is a diagram of a compiler 324, including an interpreter 326, compiling graphical code 354 for execution in a runtime environment 304. As discussed above, the compiler 324 may be configured to compile traditional source code and/or graphical code, such as the graphical code 354, generated using a graphical coding user interface, such as the graphical coding interface described in U.S. Provisional Patent Application 62/897,490 entitled "Modular Machine Learning and Artificial Intelligence," which disclosure in incorporated herein. Graphical coding may be a user friendly method of coding websites and applications. For example, the graphical code 354 includes functionality modules (i.e., functionality module 356) connected by connectors (i.e., connector 358). A graphical coding interface may allow a user to drag and drop functions and connect functions to create code to generate a desired result. Graphical coding typically may require less training and knowledge than traditional coding, opening development up to a larger group of users. However, this larger group of users may not have in-depth knowledge of task allocation, leading to development of websites and applications that run slowly due to blocking issues. Implementing a resource based multithreading module, such as ones described here, in conjunction with a graphical coding interface allows less experienced developers to build websites and applications that execute more efficiently, without additional knowledge or input as to task allocation and higher level programming concepts.

For example, in graphical code 354, the functionality modules include an input, a functionality, and an output. The functionality may include artificial intelligence or machine learning functions, which can be difficult to program when writing source code from scratch. Because of the ease of generating the graphical code 354, more developers may implement artificial intelligence or machine learning functions into websites or application. However, these artificial intelligence and machine learning functions often include processor intensive tasks that are prone to causing blocking in single event loop runtime environments. When the compiler 324 and the interpreter 326 are configured to compile graphical code including these functions such that a resource based multithreading module 306 can be used to allocate the processor intensive tasks, blocking is less likely to occur. Accordingly, developers can insert functionality modules for artificial intelligence or machine learning in a simplified programming interface with less concern about how the website or application will ultimately perform.

The functionality modules and connectors that form the graphical code 354 are associated with underlying source code. When the graphical code 354 is compiled by the compiler 324 in response to a user request, the compiler uses the underlying source code for the functionality modules and connectors to generate machine readable code to execute in the runtime environment 304. The compiler 324 includes the interpreter 326. In the implementation shown in FIG. 3, the interpreter 326 uses task data 360 to categorize tasks in the graphical code 352 as immediately executable tasks or intensive tasks and multithreading data 362 to generate an estimate of computing resources for intensive tasks.

In some implementations, the task data 360 and the multithreading data 362 may be stored locally on a computing system used to execute the graphical code 354. In other implementations, the interpreter 326 may access the task data 360 and the multithreading data 362 stored in a remote location, such as a cloud storage location. Generally the task data 360 includes information about which tasks should be categorized as immediately executable and which tasks are intensive tasks. For example, the task data 360 may be a list of possible functions executable in the runtime environment 304 and whether tasks associated with the functions are immediately executable or are intensive tasks. In some implementations, the task data 360 may be a list of functions associated with intensive tasks. Further, in some implementations, in lieu of accessing task data 360, functions in the graphical code 354 may be associated with an indication that the task is an intensive task.

The multithreading data 362 provides data for the interpreter 326, which can be used to estimate computing resources for executing intensive tasks. For example, the multithreading data 362 may include actual computing resources used in executing tasks previously or historically. A task may include both a function and the input to the function. The interpreter 326 may view or receive data regarding the actual computing resources used to execute the same function in the past. When the function was executed with the same input, the interpreter 326 may determine that the required computational resources will be the same as those used to execute the task previously. When the function was executed with different input, the interpreter 326 may use interpolation, machine learning, or other estimation methods to provide an estimate of computing resources to execute the task, or may assume that the input may be generally the same and use previously executed data. In some implementations, the multithreading data 362 is continuously updated as new tasks are executed in the runtime environment 304.

The compiler 324 creates machine readable code for execution in the runtime environment 304. The runtime environment 304 uses the categorization of tasks generated by the interpreter 326 using the task data 360 to determine how the tasks are executed. Generally, tasks categorized as intensive tasks are offloaded to the resource based multithreading module 306 for execution. The resource based multithreading module 306 uses the estimation of resources used to execute intensive tasks to allocate the offloaded intensive tasks to a processor for execution.

Figure 4:
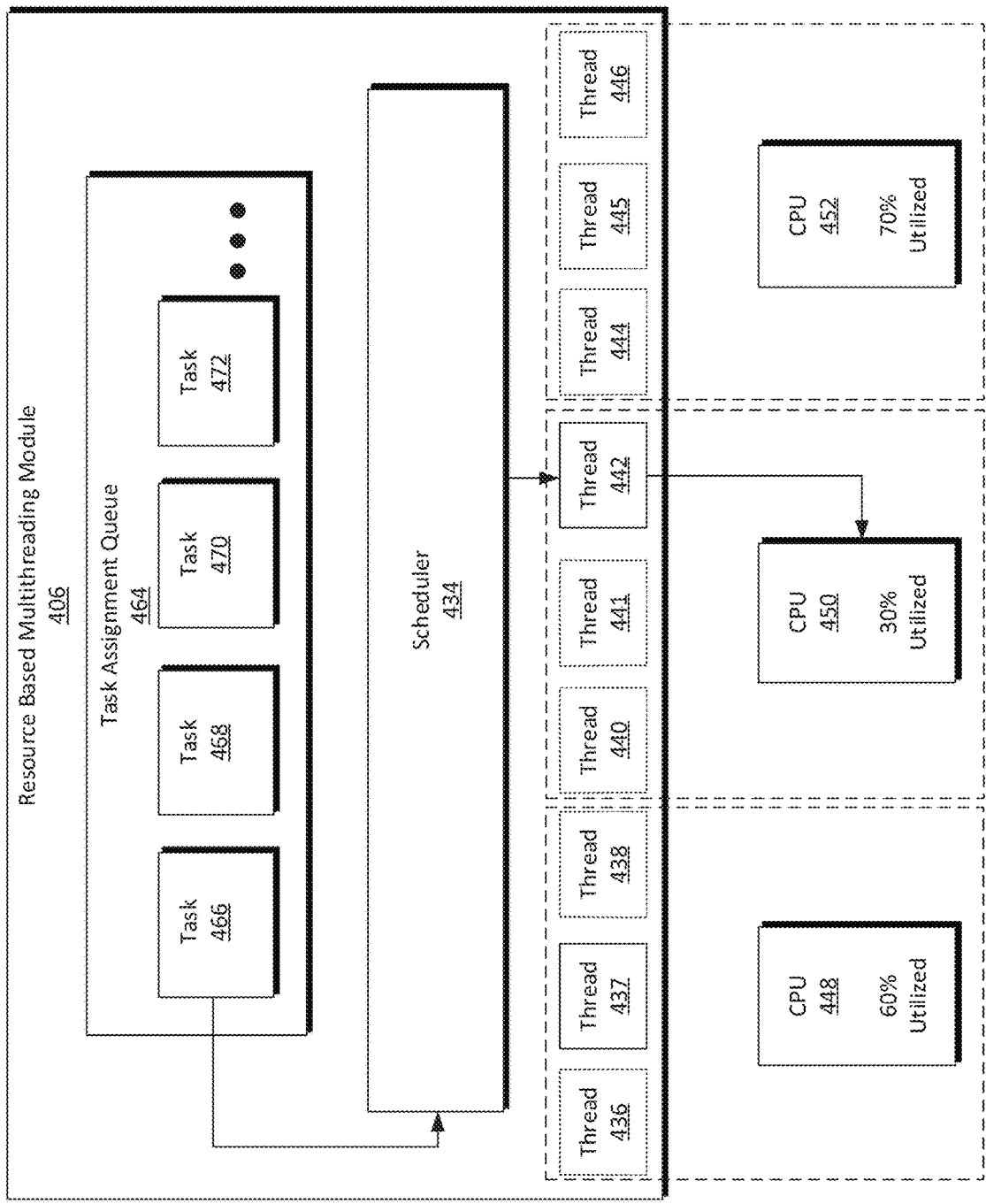
FIG. 4 is a diagram of a resource based multithreading module.

FIG. 4 is a diagram of a resource based multithreading module 406. When the resource based multithreading module 406 receives an offloaded intensive task from a runtime environment, the task is added to a task assignment queue 464. Tasks are added to the task assignment queue 464 and are generally passed to a scheduler 434 in the order the tasks are received by the resource based multithreading module. For example, in FIG. 4, task 466 is the next task passed to the scheduler 434 for allocation. Once task 466 is allocated, tasks 468, 470, and 472 are passed to the scheduler 434, in turn. In some instances, tasks 468, 470, or 472 may be allocated before task 466 is allocated because resources are available to execute task 468, 470, or 472 before resources are available to execute the task 466.

The scheduler 434 assigns tasks to threads in the resource based multithreading module 406. The threads are each associated with a computing resource, such as a CPU. For example, in FIG. 4, threads 436, 437, and 438 are associated with the CPU 448. Threads 440, 441, and 442 are associated with the CPU 450. Threads 444, 445, and 446 are associated with the CPU 452.

When the scheduler 434 receives an intensive task, the scheduler first determines available threads for execution of a new task. In FIG. 4, threads that are not available for execution of a new task are shown with a broken outline. Generally, when a thread is in use for a task, it cannot be assigned another task. As such, when all threads associated with a CPU are busy, such as threads 444, 445, and 446, the associated CPU 452 does not have a thread free for execution of a new task, regardless of the utilization of the associated CPU 452. In FIG. 4, both thread 442 and thread 437 are available for execution of a new task.

The scheduler 434 determines the current utilization of the CPUs 448 and 450 associated with the free threads 437 and 442, respectively, even if the tasks are processor or I/O intensive tasks. Because a goal of the scheduler 434 is to fully utilize the CPUs 448, 450, and 452, while also moving tasks through the task assignment queue 464 as fast as possible, the scheduler 434 uses different logic to allocate I/O intensive tasks and processor intensive tasks. Accordingly, the scheduler 434 may additionally categorize an intensive task as an I/O intensive task or a processor intensive task by using a list of known I/O tasks. In some instances, one of the CPUs 448, 450, and 450 may be dedicated to I/O intensive tasks such that all tasks that are identified as I/O intensive tasks are allocated to the dedicated CPU.

In another example, with I/O intensive tasks, the scheduler 434 may allocate the task to a CPU with a free thread, with an aim to maintain computing resources available for processor intensive tasks. In the example shown in FIG. 4, an I/O intensive task would likely be allocated to thread 437 to be executed on the CPU 448. This means that if, for example, if the next task in the queue is processor intensive, the CPU 450 could still handle execution. If the scheduler 434 allocated an I/O intensive task to thread 442 to be executed on the CPU 450, the CPU 450 would have no free threads available, but would still have a large amount of available processing resources available, which would be a poor utilization of compute resources. In these instances, if a processing intensive task were then passed to the scheduler 434, the task may be too large to execute on the CPU 448, leaving a waiting period while the scheduler 434 waits for a thread to open up on a CPU with the processing capacity to execute the processing intensive task.

With processor intensive tasks, the scheduler 434 determines a CPU with both a free thread and the processing resources available to execute the task. For example, in FIG. 4, threads 437 and 442 are available. However, the CPU 448 is 60% utilized, meaning it could likely not handle another processing intensive task without becoming over utilized, but the CPU 450 is 30% utilized and could likely comfortably take on another processor intensive task, without becoming overburdened, so the scheduler allocates the task to thread 442 to be executed by the CPU 450.

Where several CPUs are available with a free thread and sufficient resources to execute a processor intensive task, the scheduler 434 may allocate further based on the estimation of computing resources used to execute the task. For example, if a task is estimated to use an amount of resources roughly equivalent to 20% utilization of either the CPU 448 or the CPU 450 and the CPU 448 is at 40% utilization while the CPU 450 is at 50% utilization. Either the CPU 448 or the CPU 450 have sufficient resources to handle the task. In some implementations, the task may be assigned to the thread 442 for execution on the CPU 450 to leave the larger resources available on the CPU 448 available for other tasks. In other implementations, the task may be assigned to the thread 437 to execute on the CPU 448 to provide a buffer in case the estimation is incorrect. This portion of the logic of the scheduler 434 may be adjusted depending on the needs and goals of a system. For example, a system handling large numbers of processor intensive tasks may allocate so that there are more resources available for further processor intensive tasks. In contrast, a system that is performing highly critical functions, such as functions associated with emergency response, may assign tasks to ensure that there are always sufficient resources to execute the current task, even if the estimation is lower than the amount of resources a task actually takes.

After the task is executed, the result is returned to a runtime environment for execution as a callback. The thread assigned to the task is then free to complete a new task and the utilization of the associated CPU is updated to reflect that the task is complete. The runtime environment executes the callback with other callbacks and immediately executable tasks to fulfill the user request that first generated the tasks.

Figure 5:
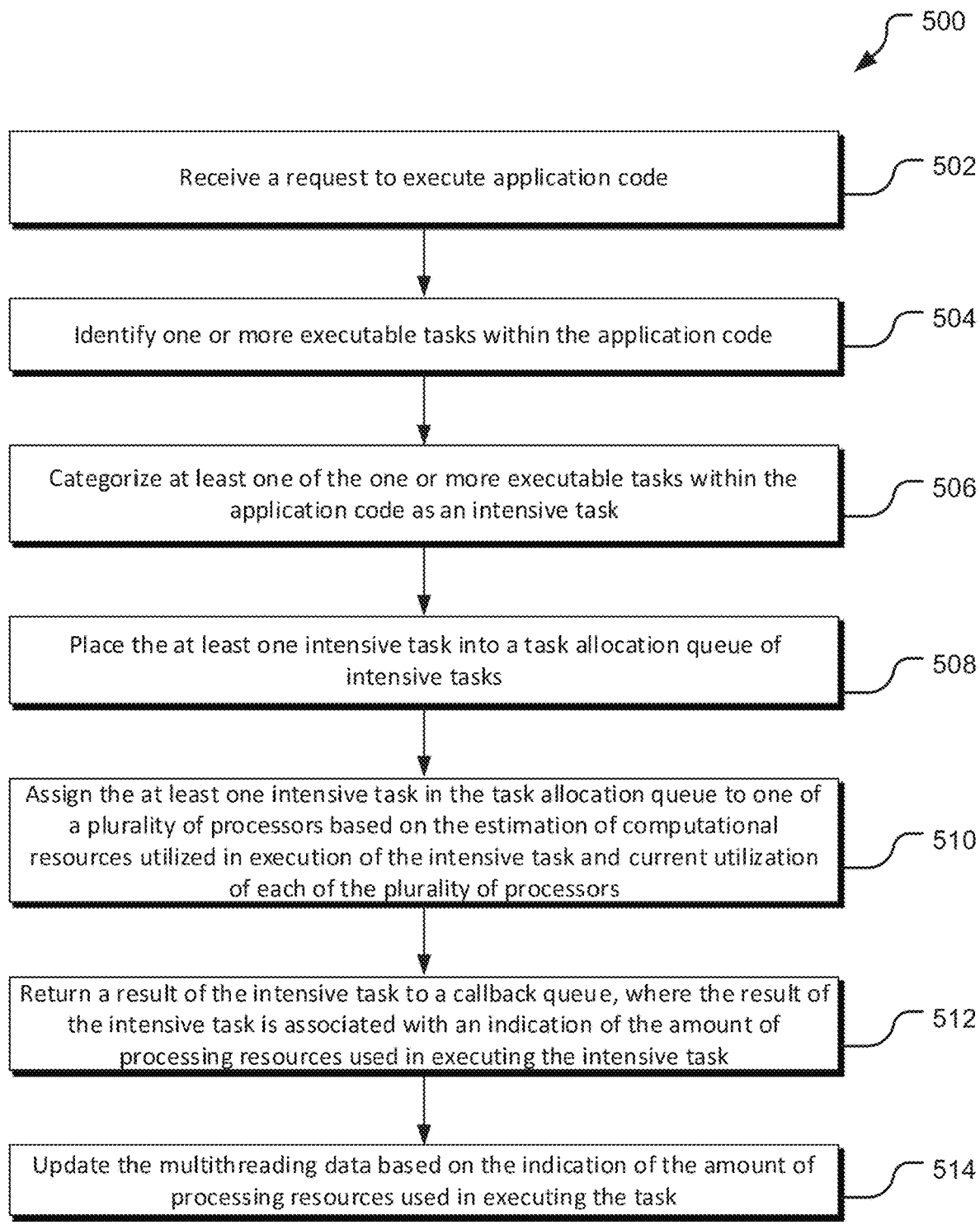
FIG. 5 is a flow diagram of operations for executing an intensive task using a resource based multithreading module.

FIG. 5 is a flow diagram of operations 500 for executing an intensive task using a resource based multithreading module 406. A receiving operation 502 receives a request to execute application code. The received request may originate from a user device accessing a website or using an application. User devices may include, for example and without limitation, personal computers, smart phones, tablets, wearable smart devices such as activity trackers or smart watches, and voice activated smart hubs. For example, when a user selects a button on a website to retrieve a file, the selection of the button is received by the receiving operation 502 as a request to execute code associated with, for example, the appearance of the user interface when the button is depressed, accessing the file, formatting the file for display to the user, etc. In some implementations, the application code is conventional source code. The conventional source code may be a task allocation agnostic code, meaning that the code does not include specialized structures, commands, or other strategies for allocating tasks of the code for efficient execution of the code.

In other implementations, the application code may be developed using, for example, a graphical programming interface (or other simplified programming interface) to generate graphical code. Graphical code may include functionality modules connected to form a program or application. The functionality modules and connectors may be associated with underlying conventional source code. In other implementations, a compiler may be configured to receive graphical code and directly compile the graphical code without first translating graphical code to conventional source code.

An identification operation 504 identifies one or more executable tasks within the application code. An executable task includes a function and an input to the function. When the application code is received as conventional source code, the identification operation 504 identifies executable tasks as determined by the runtime environment. When the application code is developed by a graphical programming interface, functionality modules and connectors of the graphical code may be associated with pre-defined executable tasks or functions usable in the identification operation 504 to identify executable tasks.

A categorizing operation 506 categorizes at least one of the one or more executable tasks within the application code as an intensive task. Intensive tasks may include processor intensive tasks, I/O intensive tasks, or both. The categorization may be based on data indicating functions associated with intensive or otherwise resource heavy tasks. For example, the categorization operation 506 may access a list of functions generally used to implement intensive tasks. When one of the functions is called, the resulting task is identified as an intensive task.

The categorization may be based on an estimate of computational resources utilized for execution of the intensive task using multithreading data. Multithreading data may be data indicating processing resources used in execution of similar tasks by the same computing system. The estimate may be generated using, for example, a machine learning module relying on the multithreading data. Computational resources may be defined in terms of processing resources and/or in terms of time to execute the task. Tasks that use more computational resources (e.g., take a long time to execute or use a large amount of processing power) are identified as intensive tasks. Intensive tasks may be defined as tasks that take more than a threshold amount of computing resources or take longer than a threshold amount of time to execute.

Generally, the intensive tasks are sent, along with the other identified executable tasks, to a single event loop runtime environment utilizing asynchronous callbacks. In the runtime environment, executable tasks that are not intensive tasks are generally executed upon reaching an execution position in a call stack in the runtime environment. In contrast, intensive tasks are offloaded upon reaching an execution position in the call stack. Instead of directly executing the task, a placing operation 508 places the at least one intensive task into a task allocation queue of intensive tasks. The task allocation queue of intensive tasks is located outside of the runtime environment.

An assigning operation 510 assigns the at least one intensive task in the task allocation queue to one of a plurality of processors based on an estimation of computational resources for execution of the intensive task and current utilization of each of the plurality of processors. Where the estimation of computation resources for execution of the intensive task is used for categorization of an executable task as an intensive task, the same estimation may be utilized in assigning the intensive task to a processor. In other implementations, the estimation may be generated in a similar manner prior to the assigning operation 510.

Generally, the assigning operation 510 occurs by assigning an intensive task to a thread associated with a processor in a plurality of processors. The assigning operation 510 may further analyze which processors in the plurality of processors have at least one thread free for execution of a task. A current utilization is then determined for each of the processors with at least one free thread. The assigning operation 510 then uses the current utilization and the estimation of computation resources used to execute the intensive task to assign the intensive task to a processor. In some implementations, the assigning operation may attempt to assign the intensive task to a processor with available resources most closely matching the estimation of resources to execute the intensive task. For both processor intensive tasks and I/O intensive tasks, this method ensures that there are enough resources to execute the task while optimizing utilization of individual processors in the plurality of processors. Once an intensive task is assigned to a processor, the processor executes the task.

A returning operation 512 returns a result of the intensive task to a callback queue, where the result of the intensive task is associated with an indication of the amount of processing resources used in executing the intensive task. The callback queue is generally a structure within the runtime environment. The task is moved to the call stack by the event loop within the runtime environment. Upon reaching the execution position in the call stack, the result of the task is used in fulfilling the user request. For example, where the result of the intensive task provides input for a subsequent task, the subsequent task may be executed. For example, a resource may be formatted to return to the user or the result of a machine learning operation may be used in a subsequent calculation.

Further, upon reaching the execution position in the call stack, the indication of the amount of processing resources used in executing the intensive task is returned to the multithreading data, which is generally located outside of the runtime environment. An updating operation 514 then updates the multithreading data based on the indication of the amount of processing resources used in executing the intensive task. Accordingly, over time, the multithreading data is more complete and more accurate estimations of computing resources can be generated. When the estimations are more accurate, intensive tasks are less likely to cause overutilization or underutilization of processors within a plurality of processors.

Figure 6:
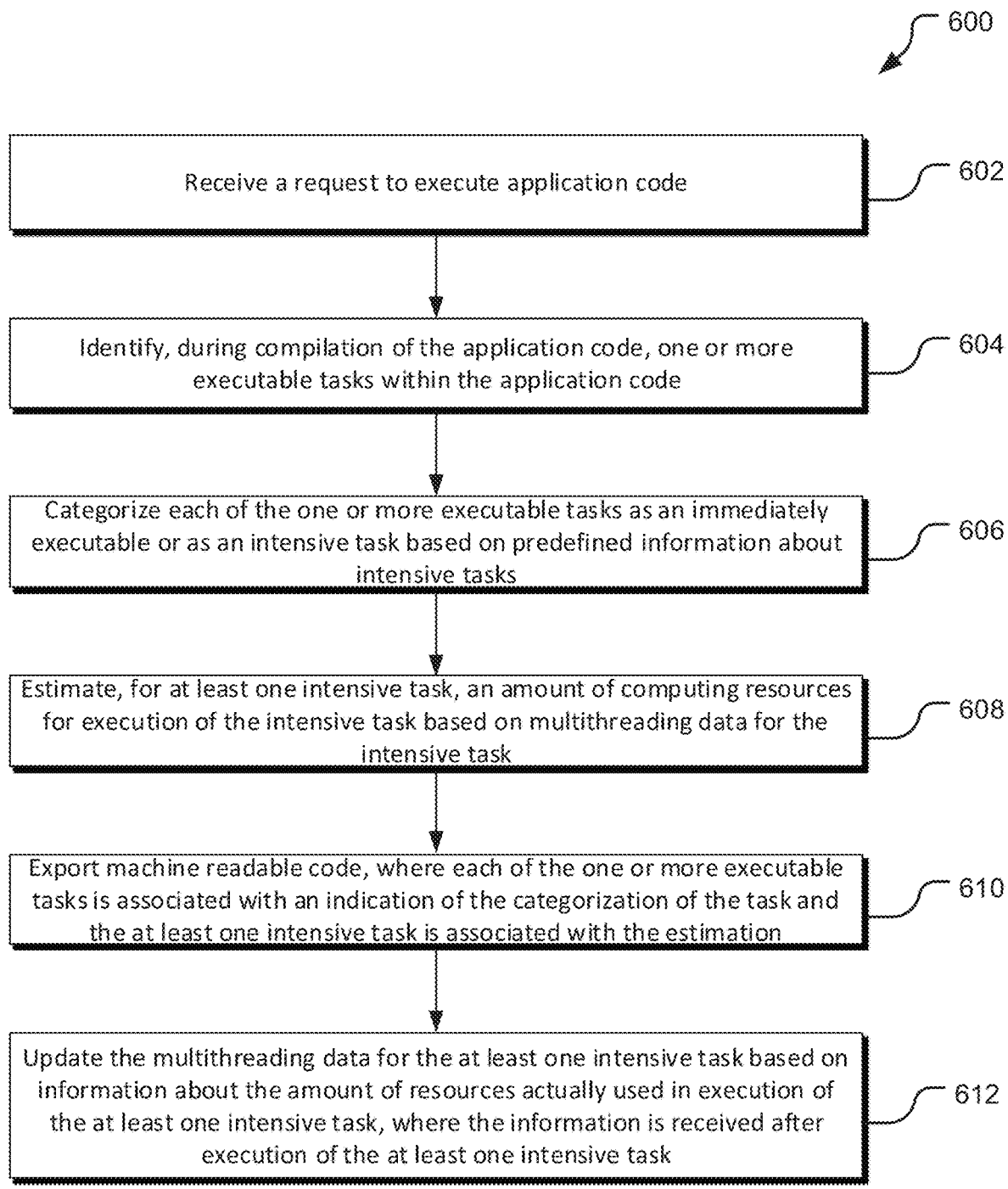
FIG. 6 is a flow diagram of operations for categorizing an intensive task and estimating resourced used for executing an intensive task.

FIG. 6 is a flow diagram of operations for categorizing an intensive task and estimating resourced used for executing an intensive task. A receiving operation 602 receives a request to execute application code. As described above with respect to FIG. 5, application code may be conventional source code or graphical source code. The request to execute the application code may be received in response to a user action. For example, the user may interact with an application through a smart hub device and may generate the request to execute the application code by verbally asking the smart hub device to perform an action associated with the application.

An identifying operation 604 identifies, during compilation of the application code, one or more executable tasks within the application code. The identification of one or more executable tasks within the application is similar to the identifying operation 504, discussed above. A categorizing operation 606 categorizes each of the one or more executable tasks as an immediately executable task or as in intensive task based on predefined information about intensive tasks. For example, the predefined information about intensive tasks may be a list of functions that generate intensive tasks. If an identified executable task calls a function on the list, the categorizing operation 606 categorizes the task as an intensive task. In other implementations, the predefined information about intensive tasks may be an indication, in the code of the intensive task, that the task is intensive.

An estimation operation 608 estimates, for at least one intensive task, an amount of computing resources for execution of the intensive task based on multithreading data for the intensive task. The multithreading data may be a machine learning module relying on historical data about computing resources used for execution of similar intensive tasks. For example, the historical data may include computing resources used in execution of functions associated with intensive tasks. The machine learning module may consider computing resources used to execute the same function with different inputs and computing resources used to execute similar functions with similar inputs in generating the estimation.

An exporting operation 610 exports machine readable code, where each of the one or more executable tasks is associated with an indication of the categorization of the task and the at least one intensive task is associated with the estimation. The indication of the categorization of the task is used by a runtime environment in execution of the task. Instead of executing intensive tasks as the intensive tasks reach an execution position in the call stack of the runtime environment, the intensive tasks are popped off of the stack and executed as callbacks using a resource based multithreading module.

When the intensive task is popped off of the stack and offloaded to the resource based multithreading module, the estimation of resources to execute the task is used to allocate the task to a processor. For example, the resource based multithreading module may allocate execution of the intensive task to a processor with available resources exceeding the estimation of resources to execute the task. The processor then executes the task and returns the result of the execution to the runtime environment. The processor also returns the amount of computing resources actually used in execution of the intensive task. An updating operation 612 updates the estimation data for the at least one intensive task based on information about the amount of resources actually used in execution of the at least one intensive task, where the information is received after execution of the at least one intensive task. For example, the updating operation 612 may occur when the task is returned to a call stack as a callback and is executed in the runtime environment.

Figure 7:
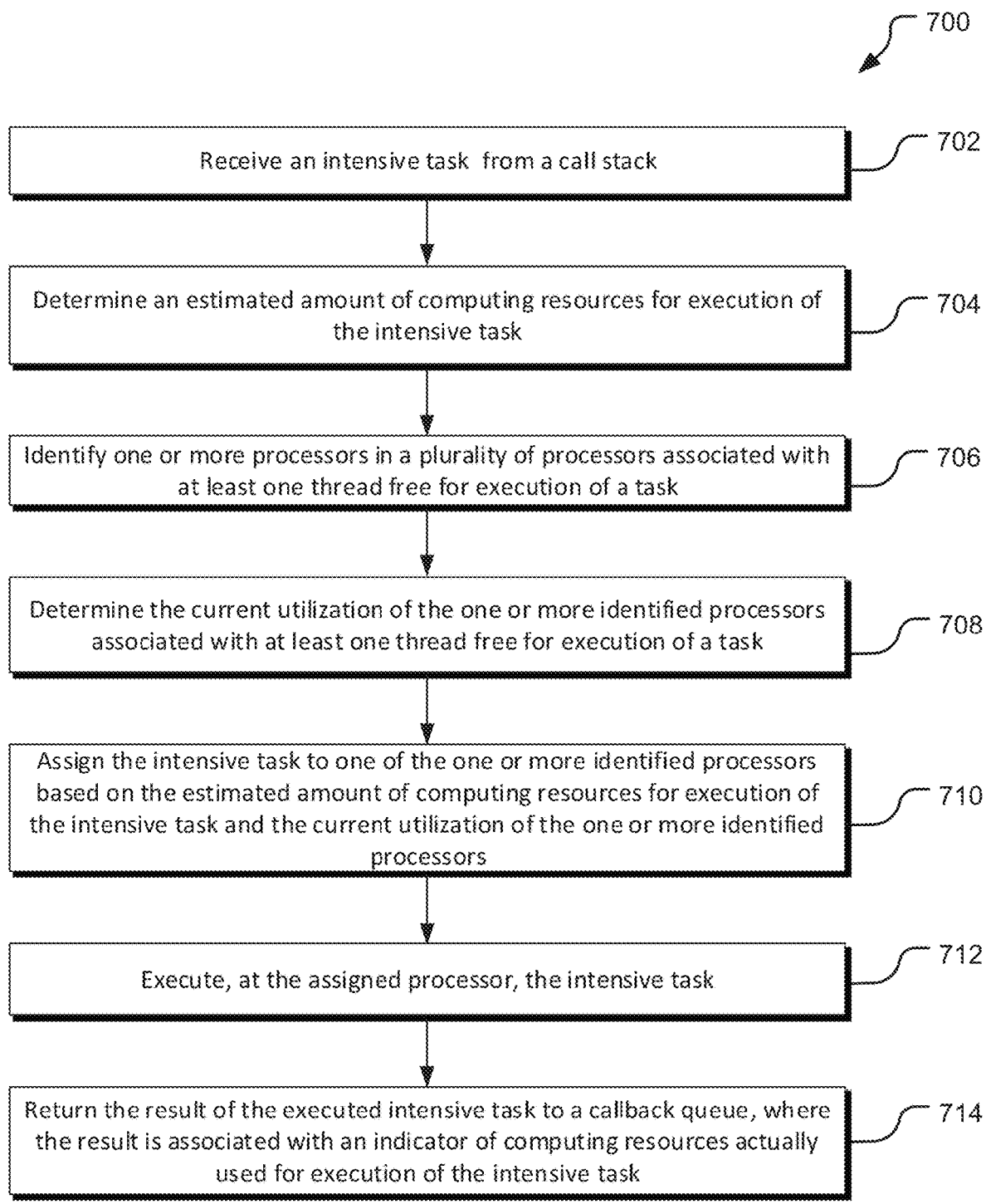
FIG. 7 is a flow diagram of operations for utilizing a resource based multithreading module for assigning an intensive task to a processor and executing the task at the assigned processor.

FIG. 7 is a flow diagram of operations for utilizing a resource based multithreading module for assigning an intensive task to a processor and executing the task at the assigned processor. A receiving operation 702 receives an intensive task from a call stack. The intensive task is offloaded from call stack of a runtime environment.

A determining operation 704 determines an estimated amount of computing resources for execution of the intensive task. The determining operation 704 may be similar to the estimation operation 608, using a machine learning module relying on estimation data to generate the estimated amount of computing resources for execution of the intensive task. In other implementations, the estimations may be predefined for functions associated with intensive tasks. For example, a function performing a calculation may be associated with a specific amount of computing resources dependent on the input such that the estimation may be generated based on a formula for the function. The formula may be updated over time using a machine learning module and data about the actual computing resources used in executing a task. This method is useful for some processor intensive functions where the computing resources used in executing a task is highly dependent on the input to the functions. Some functions, such as I/O functions, may have a predefined estimate of the amount of resources used in executing the function regardless of the inputs to the function.

An identifying operation 706 identifies one or more processors in a plurality of processors associated with at least one thread free for execution of a task. Generally, the plurality of processors are each associated with one or more threads in a thread pool. When all of the threads associated with a particular processor are busy executing a task, the processor cannot be used to execute additional tasks until a thread associated with the processor completes a task.

A determining operation 708 determines the current utilization of the one or more identified processors associated with at least one thread free for execution of a task. The current utilization of the one or more identified processors may be requested by the resource based multithreading module in response to the identifying operation 706. In other implementations, the resource based multithreading module may continuously monitor utilization of all processors associated with threads in the thread pool.

An assigning operation 710 assigns the intensive task to one of the one or more identified processors based on the estimation of the amount of computing resources for execution of the intensive task and the current utilization of the one or more identified processors. The assigning operation 710 may identify available processors based on a comparison of the estimation of the amount of computing resources for execution of the intensive task with the current utilization of the identified processors. An available processor may be defined as a processor with more computing resources available than the estimation of computing resources for execution of the intensive task. In some implementations, the assigning operation 710 may identify the available processor with an amount of available computing resources most closely matching the estimation of computing resources for execution of the intensive task. This method means that the assigned processor is as close to fully utilized as possible and that close to a maximum amount of computing resources are available for execution of other intensive tasks.

An executing operation 712 executes, at the assigned processor, the intensive task. A returning operation 714 returns the result of the executed intensive task to a callback queue, where the result is associated with an indicator of computing resources actually used in execution of the intensive task. The indicator of computing resources actually used in execution of the intensive task may be used to update estimation data used by a machine learning module in the determining operation 704. The indicator of computing resources actually used may also be used in a machine learning module to update the estimation formula associated with a function, discussed in the determining operation 704.

Figure 8:
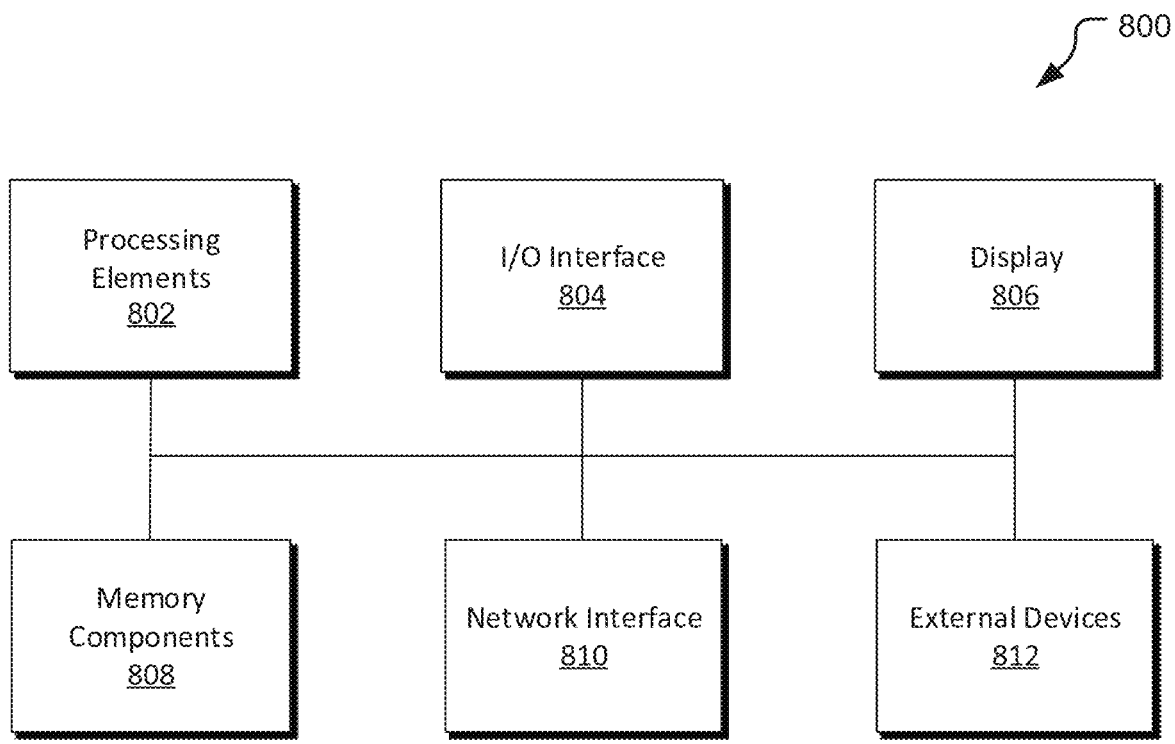
FIG. 8 is a simplified block diagram of a computing system that may be used in implementation of a resource based multithreading module.

FIG. 8 illustrates a simplified block diagram for the various devices of the system. As shown, the various devices may include one or more processing elements 802, a display 806, one or more memory components 808, a network interface 810, and external devices 812, where the various components may be in direct or indirect communication with one another, such as via one or more system buses, contract traces, wiring, or via wireless mechanisms.

The one or more processing elements 802 may be substantially any electronic device capable of processing, receiving, and/or transmitting instructions. For example, the processing elements 802 may be a microprocessor, microcomputer, graphics processing unit, or the like. It also should be noted that the processing elements 802 may include one or more processing elements or modules that may or may not be in communication with one another. For example, a first processing element may control a first set of components of the computing device and a second processing element may control a second set of components of the computing device where the first and second processing elements may or may not be in communication with each other. Relatedly, the processing elements may be configured to execute one or more instructions in parallel locally, and/or across the network, such as through cloud computing resources.

The display 806 is optional and provides an input/output mechanism for the computing devices, such as to display visual information (e.g., images, graphical user interfaces, videos, notifications, and the like) to the user, and in certain instances may also act to receive user input (e.g., via a touch screen or the like). The display may be a liquid crystal display screen, plasma screen, light emitting diode screen, an organic liquid emitting diode screen, or the like. The type and number of display may vary with the type of devices (e.g., smartphone versus a desktop computer).

The memory components 808 store electronic data that may be utilized by the computing devices, such as audio files, video files, document files, programming instructions, and the like. The memory components 808 may be, for example, non-volatile storage, a magnetic storage medium, optical storage medium, magneto-optical storage medium, read only memory, random access memory, erasable programmable memory, flash memory, or a combination of one or more types of memory components. In many embodiments, the servers 102, 106 may have a larger memory capacity than the computing devices 104, 108, with the memory components optionally linked via a cloud network or the like.

The network interface 810 receives and transmits data to and from a network to the various computing devices 114, 116, 118, 120 and other devices, such as servers. The network/communication interface 810 may transmit and send data to the network directly or indirectly. For example, the networking/communication interface may transmit data to and from other computing devices through the network which may be a cellular, satellite, or other wireless network (WiFi, WiMAX, Bluetooth) or a wired network (Ethernet), or a combination thereof. In some embodiments, the network interface may also include various modules, such as an API that interfaces and translates requests across the network to the specific local computing elements for the various computing devices 114, 116, 118, 120.

The various computing devices and/or servers 114, 116, 118, 120 may also include a power supply. The power supply provides power to various components of the computing devices 114, 116, 118, 120. The power supply may include one or more rechargeable, disposable, or hardwire sources, e.g., batteries, power cord, AC/DC inverter, DC/DC converter, or the like. Additionally, the power supply may include one or more types of connectors or components that provide different types of power to the computing devices and/or servers 114, 116, 118, 120. In some embodiments, the power supply may include a connector (such as a universal serial bus) that provides power to the computer or batteries within the computer and also transmits data to and from the device to other devices.

The input/output interface 804 allows the computing devices and/or servers 11 to receive input from a user and provide output to the user. For example, the input/output interface 804 may include a capacitive touch screen, keyboard, mouse, stylus, or the like. The type of devices that interact via the input/output interface 804 may be varied as desired. It should be noted that the various computing devices may be in communication with a compute back end, such as the server or a cloud provider, e.g., Google Cloud Platform, Amazon Web Services, Microsoft Azure, or the like.

The foregoing description, for purposes of explanation, uses specific nomenclature to provide a thorough understanding of the described embodiments. However, it will be apparent to one skilled in the art that the specific details are not required to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for execution of application code developed using a simplified programming interface comprising:
designating input/output (I/O) tasks and processing intensive tasks as event callbacks in a single event loop runtime environment where one task is executed at a time within the single event loop runtime environment, wherein the I/O tasks and processing intensive tasks are generated in association with a user request to execute the application code;
offloading tasks associated with the event callbacks to a task queue including I/O tasks and CPU intensive tasks for execution using a resource based multithreading module to allocate the tasks in the task queue between a plurality of processors based on current utilization of each of the plurality of processors and an estimation of computing resources for execution of the tasks, wherein the resource based multithreading module is separate from the single event loop runtime environment;
executing the tasks using a thread at the allocated processors of the plurality of processors; and
fulfilling the user request using results of the executed tasks provided to a callback queue of the single event loop runtime environment as the event callbacks, wherein the thread used to execute the tasks is free for tasks remaining in the task queue.

2. The method of claim 1, further comprising:
identifying the I/O tasks and the processing intensive tasks from a plurality of received executable tasks using predefined task information.

3. The method of claim 1, wherein the estimation of computing resources used in execution of the tasks is generated using at least historical data about execution of similar tasks.

4. The method of claim 3, further comprising:
reporting an actual amount of computing resources used by the allocated processors of the plurality of processors in executing the tasks; and
updating the historical data about execution of similar tasks based on the reported actual amount of computing resources used by the allocated processors of the plurality of processors in executing the tasks.

5. The method of claim 1, wherein the plurality of processors are associated with a plurality of threads.

6. The method of claim 5, wherein offloading tasks associated with the event callbacks for execution further comprises:
identifying one or more processors in the plurality of processors associated with at least one thread that is free to execute a task; and
determining a current level of resource use for each of the identified one or more processors.

7. The method of claim 6, further comprising:
for a first task of the offloaded tasks, identifying available processors of the identified one or more processors, wherein the available processors have enough free resources to execute the task based on the estimation of computing resources for execution of the task; and
allocating the first task to a processor of the available processors, wherein a difference between the available computing resources of the processor and the estimation of computing resources for execution of the first task is smaller than a difference between the available computing resources of at least one of the other available processors and the estimation of computing resources for execution of the first task.

8. The method of claim 6, further comprising:
for a tasks of the offloaded tasks, identifying the task as an I/O task; and
allocating the task to a processor of the identified one or more processors, wherein the processor has a highest current level of resource of the identified one or more processors.

9. A computing system for executing a task allocation agnostic application code comprising:
a plurality of processors;
an application engine comprising:
an interpreter configured to identify an input/output (I/O) task or a processor intensive task as an intensive task from a plurality of tasks in the task allocation agnostic application code corresponding to a received request from a user, the identification based on an estimation of computing resources for execution of the intensive task;
a single event loop runtime environment comprising:
a call stack configured to execute the tasks of the application code, wherein the call stack executes tasks sequentially as a task reaches an execution position within the call stack; and
a resource based multithreading module comprising:
a task queue configured to remove the intensive task from the call stack as the intensive task reaches the execution position, the task queue including both I/O tasks and processor intensive tasks,
a scheduler configured to allocate the intensive task to a processor of the plurality of processors based on the estimation of computing resources for execution of the intensive task and a current utilization of each of the plurality of processors, wherein the processor executes the allocated intensive task using a thread to obtain a result of the intensive task, and
an interface configured to return the result of the intensive task to the runtime environment, wherein the single event loop runtime environment is configured to return the result of the intensive task to the call stack as an event callback and use the result of the intensive task in completing the request of the user when the result of the intensive task reaches the execution position, wherein the thread used to execute the task is free for tasks remaining in the task queue.

10. The computing system of claim 9, wherein the runtime environment further comprises:
a callback queue; and
an event loop configured to control movement of callbacks from the callback queue to the call stack.

11. The computing system of claim 10, wherein the scheduler is further configured to:
receive a result of the executed intensive task from the assigned processor; and
return the result to the callback queue of the runtime environment.

12. A method for allocating an intensive task in an application code developed using a programming interface to a processor for execution, the method being obscured from the programming interface and comprising:
accessing the intensive task in a task queue comprising input/output (I/O) tasks and processing intensive tasks received from a JavaScript runtime environment as a result of a received user request to execute the application code;
determining an estimation of computing resources for execution of the intensive task;
allocating the intensive task to one of a plurality of processors based on a current utilization of each of the plurality of processors and the determined estimation of computing resources for execution of the intensive task;
processing the task at the allocated processor using a thread of the thread queue; and
returning the processed task to a callback queue of the JavaScript runtime environment as a callback, wherein the JavaScript runtime environment uses the processed task in completing the user request, wherein the thread used to process the task is free for tasks remaining in the task queue.

13. The method of claim 12, further comprising:
identifying the intensive tasks from a plurality of tasks identified from the application code in response to receipt of the user request.

14. The method of claim 13, wherein the code is graphical code including functional modules and connectors, wherein the functional modules and connectors are associated with underlying source code.

15. The method of claim 14 wherein at least one functional module of the graphical code defines one of a machine learning operation and an artificial intelligence operation.

16. The method of claim 14, wherein the functional modules further include pre-defined intensive tasks.

17. The method of claim 12, further comprising:
returning a response to the user request to a user device.

18. The method of claim 12, wherein the estimation of computing resources for one of the intensive tasks is determined based on historical data about the execution of intensive tasks.

19. The method of claim 18, further comprising:
updating the historical data about the execution of intensive tasks based on actual computing resources used for the task, wherein the processed task is returned to the JavaScript runtime environment with an indication of the actual computing resources used for the task.

20. The method of claim 19, wherein the intensive task is a processor intensive task, wherein the processor intensive task uses more than a threshold amount of computing resources.

* * * * *